United States Patent [19]
Takae et al.

[11] 3,861,889
[45] Jan. 21, 1975

[54] PROCESS FOR REMOVING DUST FROM A GAS STREAM

[75] Inventors: Toshinori Takae; Toyotaro Kawabe; Shohei Maeno, all of Takaishi City, Japan

[73] Assignee: Mitsui Toatsu Chemicals, Incorporated, Tokyo, Japan

[22] Filed: Dec. 26, 1973

[21] Appl. No.: 427,636

Related U.S. Application Data

[63] Continuation-in-part of Ser. No. 205,601, Dec. 7, 1971, abandoned.

[30] Foreign Application Priority Data
Dec. 16, 1970 Japan.............................. 45-11870

[52] U.S. Cl............................. 55/70, 55/90, 55/233
[51] Int. Cl............................................ B01d 53/14
[58] Field of Search ......... 55/89, 90, 233, 257, 522, 55/DIG. 13, 70; 71/64 DB; 261/94, 98, 112

[56] References Cited
UNITED STATES PATENTS

| 3,059,280 | 10/1962 | Laehder ........................... 71/64 DB |
| 3,171,820 | 3/1965 | Volz..................................... 261/94 |
| 3,293,174 | 12/1966 | Robjohns............................. 261/94 |
| 3,522,692 | 8/1970 | Brookman et al. ................... 261/98 |

*Primary Examiner*—Charles N. Hart
*Attorney, Agent, or Firm*—Fisher, Christen & Sabol

[57] ABSTRACT

Dust is removed from a gas stream containing the same by passing the gas stream through a layer of a foamed material having a non-cellular porosity of over 90 percent, the layer being impregnated with a solvent for the dust. Prior to being passed through the layer of foamed material, the gas stream may be washed with said solvent for the dust.

11 Claims, 3 Drawing Figures

PATENTED JAN 21 1975 3,861,889

PROCESS FOR REMOVING DUST FROM A GAS STREAM

CROSS REFERENCE TO RELATED APPLICATION

This application is a continuation-in-part of application Ser. No. 205,601 filed Dec. 7, 1971 and now abandoned.

BACKGROUND OF INVENTION

1. Field of the Invention

This invention relates to an improved process for removing dust from a gas stream containing the same and, more particularly, it relates to an improved process for removing dust soluble in a solvent for the dust using an improved filter medium.

The term "dust" means, in the present invention, fine particles of solid suspended in a gas, including aerosols, in addition to dust in itself.

2. Description of the Prior Art

With the rapid progress and development of the chemical industry, various kinds of dusts exhausted from factories have been increasing in their quantities. These dusts, however, contaminate the air, blast and injure plants, impair animals and, accordingly, give undesirable effects on human beings directly or indirectly, thereby causing great air pollution problems.

Hitherto, there has been used for removal of dusts from a gas stream containing the same a process of washing the gas stream with water or a liquid, a process of filtering the gas stream with a filter of dry type or wet type, or a combination of these processes. However, the removal ratios of dust are low in the processes comprising washing or filtering by a dry type filter and, in the process comprising filtering by a wet type filter, pressure loss caused by the filter is high even though the removal ratio of dust can be made high. Therefore, there has been desired to develop an improved process for removing dust in order to prevent air pollution.

SUMMARY OF THE INVENTION

An object of the present invention is to provide an improved process for removing dust from a gas stream containing the same.

Another object of the present invention is to provide an economical process for removing dust from a gas stream containing the same with a high removal ratio and low pressure loss.

Still another object of the present invention is to provide an improved process for preventing air pollution.

a further object of the present invention is to provide an improved process for removing dust exhausted from prilling towers for fetilizers.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description. It has been found that the above objects can be attained by practicing the present invention.

According to the present invention, dust contained in a gas stream is removed therefrom by passing said gas stream through a layer of a foamed material having a non-cellular porosity of over 90 percent, said porous foamed material being impregnated with a solvent for said dust. Prior to passing the gas stream through said layer, said gas stream is preferably washed with said solvent, whereby a major portion of said dust may be washed into said solvent.

Dusts which are removable from gas streams according to the present invention include, for example, dusts of fertilizer materials such as urea, ammonium nitrate, ammonium sulfate, ammonium chloride, ammonium phosphates and potassium salts, and dusts of other inorganic salts and organic compounds. These dusts may be exhausted from various processing steps, for example, steps of granulation, prilling, drying and packing.

The foamed material used as a filter medium in the present invention is of a non-cellular porosity of over 90 percent, and by said non-cellular porosity is meant a ratio of the volume of non-cellular foam to the total volume of cellular and non-cellular foam included therein. Any gas contained in the non-cellular foam can be replaced by atmospheric air; that is, the non-cellular foam is open to the atmosphere. on the contrary, gas contained in the cellular foam cannot be replaced by atmospheric air; that is, the cellular foam is closed to the atmosphere. Examples of the foamed material include polyurethane foam resin, polyethylene foam resin and foam rubber.

The foamed material is impregnated with water or other solvent suitable for absorbing a particular dust. Impregnation of the foamed filter medium with a solvent may be conducted continuously or batchwise. For example, the impregnation may be conducted by permitting the solvent to flow down continuously or intermittently on the surface at the gas outlet side of a foamed filter medium. As stated above, it is preferable to wash a gas containing a dust with a solvent prior to filtering the dust through a foamed filter medium whereby dust of relatively large particle size is removed.

The selection of percentage of non-cellular porosity of the foamed material is very important, since the smaller the noncellular porosity, the larger is the pressure loss caused by the foamed material. Generally speaking, the pressure loss is preferably less than 100 mm $H_2O$ (water column) in order to have an efficient operation at low cost. Table I shows the pressure loss in mm $H_2O$ at various surface velocities and open-cellular porosities.

Table I

| Surface Velocity (m/sec) | Non-cellular porosity (%) | | | | |
|---|---|---|---|---|---|
| | 85 | 90 | 95 | 98 | 99 |
| 0.2 | 20.1 | 19.1 | 18.2 | 17.6 | 17.5 |
| 0.6 | 39.8 | 31.9 | 25.0 | 21.4 | 20.3 |
| 0.8 | 57.9 | 43.8 | 31.0 | 24.9 | 22.9 |
| 1.0 | 82.2 | 59.8 | 40.1 | 30.0 | 26.5 |
| 1.4 | 153 | 106 | 65.3 | 43.2 | 36.7 |
| 1.7 | 230 | 156 | 91.9 | 57.9 | 47.4 |
| 2.0 | 325 | 219 | 126 | 75.9 | 61.3 |

As clearly shown in Table I, the pressure loss at a low surface velocity is relatively low even with a non-cellular porosity. However, at a high surface velocity, the pressure loss is extremely large with a non-cellular porosity of less than 90 percent. Therefore, in the present invention, a foamed material having a non-cellular porosity of over 90 percent is used for the filter medium. A foamed material having a non-cellular porosity of over 95 percent is especially preferable. A non-cellular porosity of over 97 percent is most preferable.

Generally speaking, the non-cellular porosity of a foamed resin is in the range of from 80 to 90 percent. Therefore, when the open-cellular porosity of a foam resin is less than 90 percent,, the foam resin is subjected to a pretreatment in order to raise the non-cellular porosity into the desired range. Such pretreatment is, for example, as follows:

A foamed resin is impregnated with water or an aqueous solution having a pH of from 3 to 11, preferably 7 to 11, such as an aqueous soution of urea of 30 weight %. Then the foamed resin is pressed, for example by means of a roller-press, to convert cellular foam into non-cellular foam. The compression ratio is preferably higher than 5.

The surface velocity of the gas steam to be treated according to the present invention is preferably less than 2 meters per second and most preferably in the range of 0.5 to 1.3 meters per second.

The thickness of the foamed material filter layer suitable for practicing the present invention will vary dependent upon such considerations as the amount of dust in the air stream to be treated, the bulk density of the foamed material and the surface area of the layer contacted by the gas stream. Generally speaking, the thckness is commensurate with substantially 100 percent removal of dust from the gas stream when the foamed filter layer is impregnated with a solvent for said dust in accordance with the present invention. For example, the thickness may vary from about 0.3 to about 1.2 inches, preferably from about 0.4 to about 0.8 inches. The bulk density may vary from about 0.02 to 0.05 gram/cm$^3$, preferably from about 0.022–0.024 gram/cm$^3$.

Figure 1:
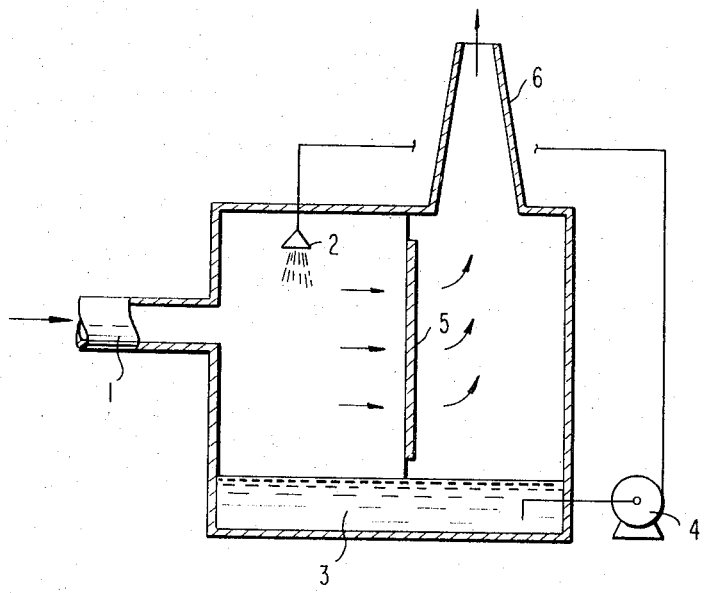
FIG. 1 shows an example of an apparatus adopted to carry out the process of the present invention.
Figure 2:
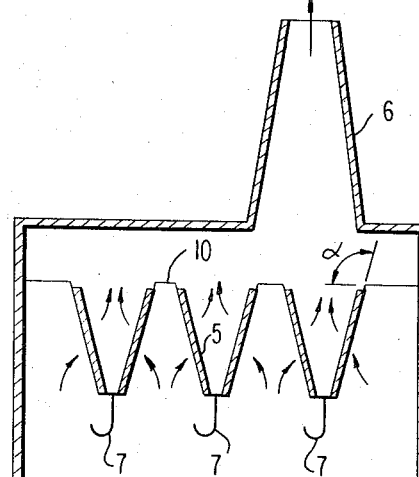
FIG. 2 shows another example of an apparatus adopted to carry out the process of the present invention.
Figure 3:
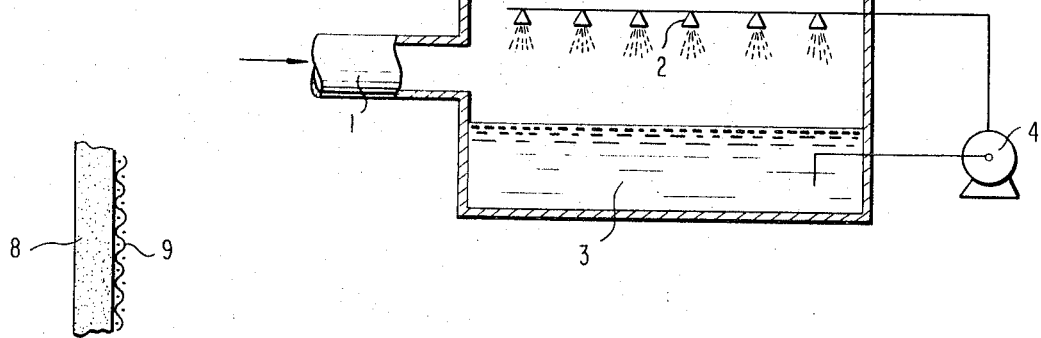
FIG. 3 is an enlarged view of a filter medium used in the present invention.

The method of the present invention shall be explained in accordance with the drawing from FIG. 1 to FIG. 3.

DESCRIPTION OF THE PREFERRED EMBODIMENTS

Referring now to FIGS. 1 and 2, a gas stream containing dust from duct 1 is washed with a solvent for the dust sprayed from nozzle 2. The solvent is fed from a solution reservoir 3 to spray nozzle 2 by means of pump 4 so that dust of relatively large diameter can be dissolved into the solvent, The gas stream which has been washed with the solvent is then filtered through filter layer 5 of a foamed material having a non-cellular porosity of over 90 percent and thereby the fine particles are removed and exhausted through exhaust duct 6. The solvent is flowed down on the surface at the gas outlet side of the filter layer 5. The filter layer, as shown in FIG. 2, is suitable for a compact size apparatus wherein it is composed of a filter layer fixed to a frame 10 whose cross-section perpendicular to the surface of the filter layer is of an isosceles trapezoid. An angle ($\alpha$) of the surface of the filter layer to the horizontal (as shown in FIG. 2) should be an obtuse angle of less than 120°, preferably within the range of 95° to 110°. In case the angle ($\alpha$) exceeds the upper limit of the above range, the liquid tends to stagnate on the filter surface, thereby lowering the effectiveness of the filter and resulting in a poor removal ratio of dust. On the other hand, when the angle is too small to fall in this range, then there will be a great pressure loss due to the filter layer. Shown at 7 is a U-Shaped tube adapted to exhaust the solvent which has flowed down on the surface of the filter layer. To prevent splashing of the solvent droplets, it is preferable to provide, as shown in FIG. 3, a net or mesh 9 of metal or synthetic fiber on the surface at the gas outlet side of the foamed material 8.

The advantages of the present invention are as follows:

Firstly, the process of the present invention provides substantially 100 percent of dust removal ratio with low pressure loss. In the case of a dry type filter wherein a polyurethane foam resin is used for the filter layer, the removal ratio for dust of 1 to 100$\mu$ diameter is found to be at most 50 percent. On the other hand, according to a dust removing process such as the so-called water curtain, which provides a relatively lower construction cost and operating expense, there is removed only 80 to 90 percent of the urea dust contained in the exhaust gas from a urea prilling tower. In contrast with this, the process of the present invention can provide a removal ratio of substantially 100 percent of dust by impregnating with a solvent for the dust a foamed material having a non-cellular porosity of over 90 percent, said solvent being used to dissolve the dust therein.

Secondly, a conventional dust filtering appartus causes a pressure loss of 50 to 100 mm $H_2O$ at a surface velocity of 10 cm/sec, whereas the present invention provides a pressusre loss of at most 60 mm $H_2O$ at a surface velocity of 1m/sec, as shown in the foregoing Table I.

Thirdly, according to the present invention, the materials which have been exhausted in the form of a dust can be reproduced by concentrating the resulting solution obtained during catching the dust. This means that the present invention provides not only measures for preventing air pollution but also improvements in productivity.

The process according to the present invention can be applied, as has been desribed heretofore, to a process for removing various kinds of dusts from gas streams containing the same to prevent air pollution. The optimum application of the present invention, however, is to remove fertilizer dusts such as urea dust and ammonium nitrate dust contained in an air stream used for cooling fertilizer granules and exhausted from prilling towers at large scale fertilizer plants. The prilling of the fertilizer can be conducted by a known process which comprises steps of producing an anhydrous melt by melting the fertilizer or a concentrated solution of over 90 weight % of the fertilizer by concentating an aqueous solution thereof, dividing the anhydrous molten urea into liquid droplets by, for example, passing it through nozzles, and cooling the liquid droplets with an air stream to form urea prills.

The invention is explained, but not limited, by the following examples.

EXAMPLE I

As shown in FIG. 2, the exhaust air stream from urea prilling towers was introduced through duct 1 into the apparatus. The exhaust air stream contained 500 to 1000 mg/m³ of urea dust whose diameter was within the range of 1 to 10μ. The exhaust air steam was then washed with an aqueous urea solution sprayed from spray nozzle 2 and thereby 90 percent of the dust was washed into the aqueous urea solution. The aqueous urea solution was stored in a solution reservoir 3 and then fed by means of a pump 4 to the spray nozzles for circulation. A part of the urea soluton was discharged therefrom for the recovery of urea dissolved therein and then water was added in an amount sufficient to supplement the amount of the urea solution discharged.

The exhaust air stream which had been washed with the urea solution was filtered through a filter layer at a surface velocity of 1.0 m/sec, thereby removing the urea dust from the air stream and was then withdrawn through exhaust duct 6. The air stream from exhaust duct 6 contained 10 mg/m³ of the urea dust. The pressure loss was 29.5 mm H₂O. The filter layer used was of ether type polyurethane foam resin useful for cushioning and having a thickness of 10 mm and an open-cellular porosity of 98 percent. The angle (α) of the filtrating surface to the horizontal was 100°. The small droplets of urea solution formed by means of the spray nozzle reached the surface of the filter layer at the gas outlet side, thereby the filter layer was impregnated by the urea solution. The urea solution into which urea dust had been dissolved, was exhausted through U-shaped tube 7 into solution reservoir 3.

EXAMPLES II–V

Dusts indicated in Table II were removed from air streams according to the same procedure described in Example I. Operation conditions and results are indicated in Table II.

Table II

| Example No. | Dust | Amount of dust contained in air stream (mg/m³) | Surface velocity of air stream (m/sec) | open-cellular porosity (%) | Removal ratio of dust | | Pressure loss (mmH₂O) |
|---|---|---|---|---|---|---|---|
| | | | | | By washing (%) | Total (%) | |
| II | Ammonium nitrate | 788 | 0.94 | 91.0 | 90.8 | 99.7 | 53.6 |
| III | Ammonium sulfate | 608 | 0.92 | 99.5 | 94.0 | 99.6 | 20.8 |
| IV | Sodium chloride | 592 | 0.92 | 98.7 | 92.8 | 99.3 | 26.6 |
| V | Sodium carbonate | 633 | 0.95 | 98.5 | 89.6 | 99.1 | 27.4 |

What is claimed is:

1. A process for removing a soluble solid dust from a gas steam containing the same which comprises spraying said gas stream with a solvent for said dust to wash the major portion of said dust into said solvent and removing the remaining portion of said dust from said gas stream by passing the depleted gas stream through a layer of a foamed material having a non-cellular porosity of over 90 percent and impregnated with said solvent at a surface velocity of less than 2 meters per second, the angle of the surface of said layer to the horizontal being an obtuse angle of less than 120°, whereby the pressure loss is less than 100 mm H₂O (water column).

2. The process as claimed in claim 1 wherein said soluble solid material is a solid fertilizer.

3. The process as claimed in claim 1 wherein said surface velocity is in the range of 0.3 to 1.5 meters per second.

4. A process for removing a dust selected from the group consisting of urea dust and ammonium nitrate dust from an air steam containing the same and exhausted from the step of prilling a member selected from the group consisting of urea and ammonium nitrate which comprises introducing said gas stream into a spraying zone at a surface velocity of less than 2 meters per second, sprayng into said gas stream a solvent selected from the group consisting of water, an aqueous urea solution and an aqueous ammonium nitrate solution thereby washing a major portion of said dust into said solvent, and passing said depleted air steam containing the remaining portion of said dust and the small droplets of said solvent resulting from said spraying through a filtering layer of foamed material having a non-cellular porosity of over 90 percent to catch said remaining portion of said dust and said small droplets of said solvent, thereby impregnating said layer with said small droplets of said solvent caught by said layer.

5. The process as claimed in claim 4 wherein the angle of the surface of said layer to the horizontal is an obtuse angle of less than 120°, and said solvent is flowed down on the surface at the gas outlet side of said layer.

6. The process as claimed in claim 4 wherein said foamed material is a member selected from the group consisting of polyurethane foam resin, polyethylene foam resin and foam rubber.

7. The process as claimed in claim 6 wherein said foamed material is polyurethane foam resin.

8. The process as claimed in claim 7 wherein said polyurethane foam resin has a non-cellular porosity of over 95 percent.

9. The process as claimed in claim 7 wherein said polyurethane foam resin has a non-cellular porosity of over 97 percent.

10. The process as claimed in claim 4 wherein said surface velocity is in the range of from 0.5 to 1.3 meters per second.

11. The process as claimed in claim 4 wherein said filtering layer is provided with a member selected from the group consisting of a net and a mesh on the gas outlet surface to prevent splashing of the solvent droplets.

* * * * *

UNITED STATES PATENT OFFICE
CERTIFICATE OF CORRECTION

PATENT NO. : 3,861,889
DATED : January 21, 1975
INVENTOR(S) : Toshinori TAKAE et al.

It is certified that error appears in the above-identified patent and that said Letters Patent are hereby corrected as shown below:

Col. 1, line 51 "a further" should be --A further--

Col. 3, line 19 "gas steam" should be --gas stream--

Col. 4, line 38 "appartus" should be --apparatus--

Col. 5, line 9 "air steam" should be --air stream--

Col. 5, line 61 "gas steam" should be --gas stream--

Col. 6, line 12 "air steam" should be --air stream--

Col. 6, line 21 "air steam" should be --air stream--

Signed and Sealed this

Twenty-first Day of June 1977

[SEAL]

Attest:

RUTH C. MASON
Attesting Officer

C. MARSHALL DANN
Commissioner of Patents and Trademarks